(12) United States Patent
Staub et al.

(10) Patent No.: US 10,836,489 B2
(45) Date of Patent: Nov. 17, 2020

(54) CABIN MONUMENT FOR AN AIRCRAFT

(71) Applicant: Airbus Operations GmbH, Hamburg (DE)

(72) Inventors: Martin Staub, Hamburg (DE); Thorsten Otto, Hamburg (DE); Markus Schumacher, Buxtehude (DE); Andreas Heidtmann, Fredenbeck (DE); Jana Witt, Apensen (DE)

(73) Assignee: Airbus Operations GmbH (DE)

( * ) Notice: Subject to any disclaimer, the term of this patent is extended or adjusted under 35 U.S.C. 154(b) by 375 days.

(21) Appl. No.: 15/878,627

(22) Filed: Jan. 24, 2018

(65) Prior Publication Data

US 2018/0222587 A1 Aug. 9, 2018

(30) Foreign Application Priority Data

Feb. 9, 2017 (DE) .................. 10 2017 202 068

(51) Int. Cl.
*B64D 11/00* (2006.01)
*B64D 11/02* (2006.01)

(52) U.S. Cl.
CPC .............. *B64D 11/00* (2013.01); *B64D 11/02* (2013.01); *B64D 2011/0046* (2013.01)

(58) Field of Classification Search
CPC .. B64D 2011/0046; B64D 11/00; B64D 11/02
See application file for complete search history.

(56) References Cited

U.S. PATENT DOCUMENTS

| 3,295,279 A | 1/1967 | Wilkins |
| 3,955,700 A | 5/1976 | Pedraza |
| 5,024,398 A * | 6/1991 | Riedinger .......... B64D 11/0015 244/118.5 |
| 5,026,006 A * | 6/1991 | Tinder .................. B64D 25/00 244/118.5 |
| 7,261,786 B2 * | 8/2007 | Druckman .............. B29C 53/66 156/169 |
| 9,016,626 B2 * | 4/2015 | Schliwa ................ B61D 35/00 244/118.5 |
| 9,260,189 B2 * | 2/2016 | Savian ................... B64D 11/02 |
| 9,896,209 B2 * | 2/2018 | Wartena .................. B64D 9/00 |
| 10,232,942 B2 * | 3/2019 | McKee ............... B64D 11/003 |

(Continued)

FOREIGN PATENT DOCUMENTS

| WO | 2013074082 A1 | 5/2013 |
| WO | 2015148712 A1 | 10/2015 |

OTHER PUBLICATIONS

German Search Report for Application No. 102017202068.7 dated Dec. 11, 2017; p. 2 categorizing the cited references.

*Primary Examiner* — Brian M O'Hara
*Assistant Examiner* — Michael B. Kreiner
(74) *Attorney, Agent, or Firm* — Lerner, David, Littenberg, Krumholz & Mentlik, LLP

(57) ABSTRACT

A cabin monument for an aircraft includes a floor panel, which forms a base surface of the cabin monument, and a surrounding sidewall which defines an interior space of the cabin monument. The surrounding sidewall is assembled from a first wall part and a second wall part which is coupled to this. Provision is made on at least one of the wall parts for a fixing section which is overlapped by the floor panel. Also described is an aircraft which features such a cabin monument.

11 Claims, 4 Drawing Sheets

(56) References Cited

U.S. PATENT DOCUMENTS

| | | | |
|---|---|---|---|
| 10,486,832 B2* | 11/2019 | Abelon | B64F 5/10 |
| 10,556,686 B2* | 2/2020 | Heidtmann | B64D 11/02 |
| 2006/0054742 A1 | 3/2006 | Druckman et al. | |
| 2009/0166472 A1 | 7/2009 | Kook et al. | |
| 2013/0099055 A1* | 4/2013 | Pfeiffer | B64C 1/18 |
| | | | 244/118.5 |
| 2016/0258462 A1 | 9/2016 | Lewis et al. | |
| 2018/0363311 A1* | 12/2018 | Liao | E04H 1/02 |

\* cited by examiner

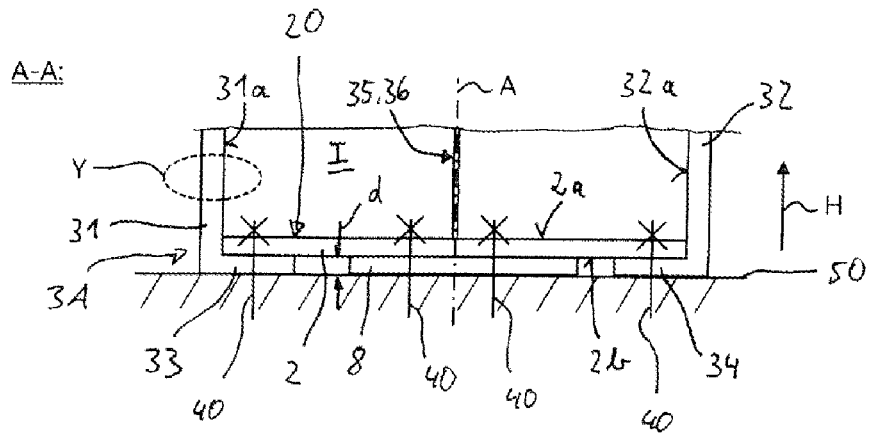
Fig. 3
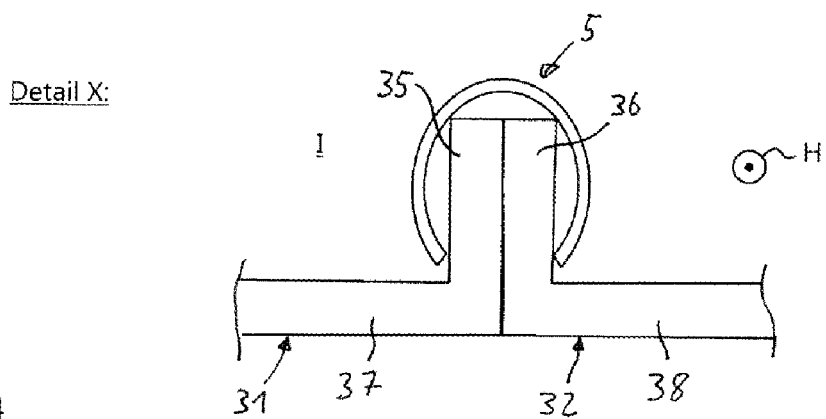
Fig. 4
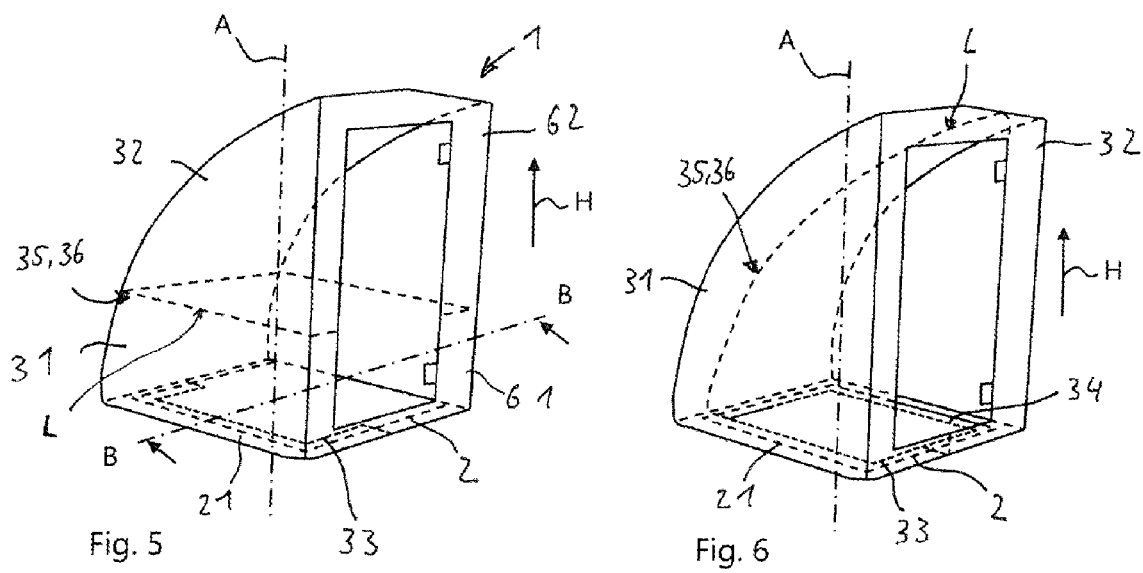
Fig. 5
Fig. 6

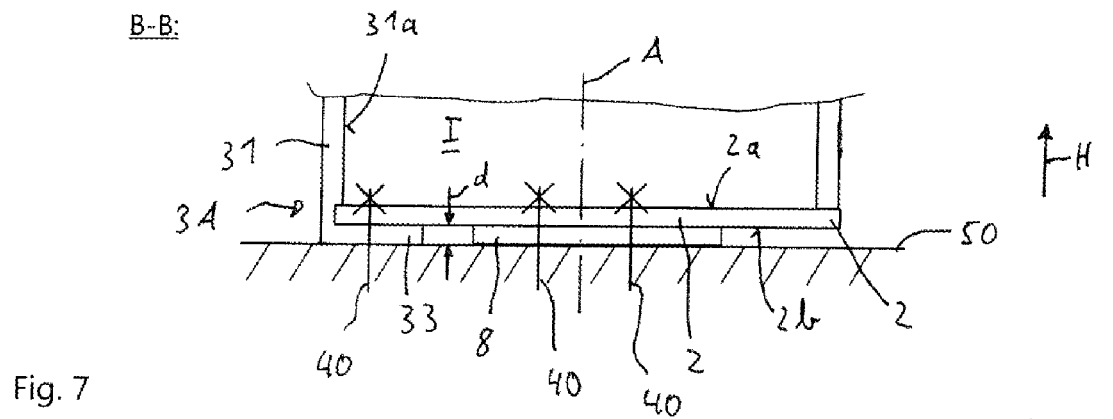
Fig. 7
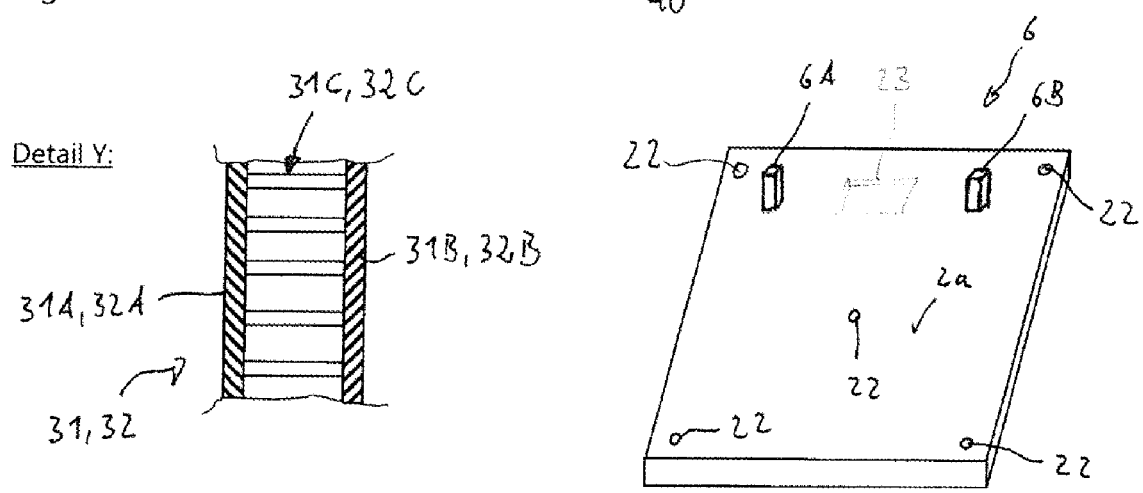
Fig. 8
Fig. 9
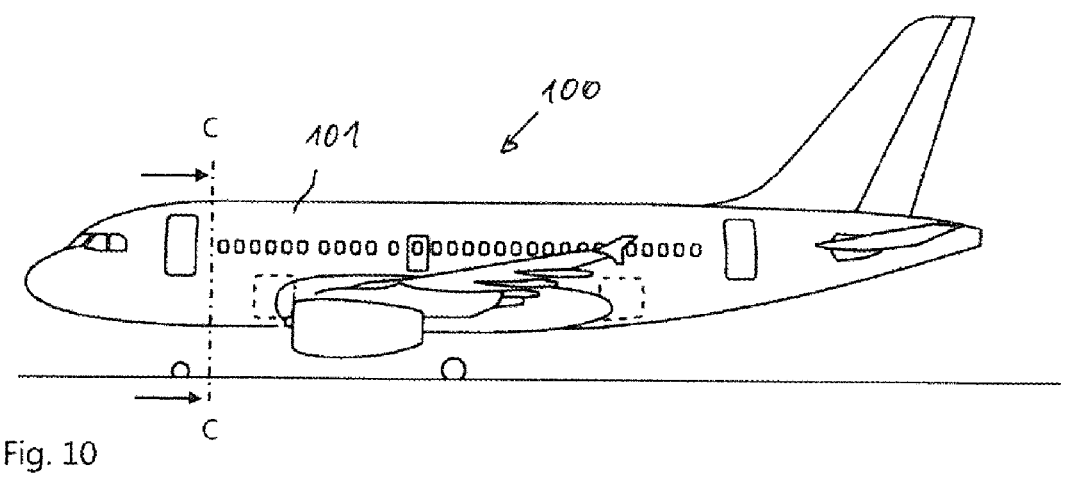
Fig. 10

CABIN MONUMENT FOR AN AIRCRAFT

FIELD OF THE INVENTION

The present invention relates to a cabin monument for an aircraft.

BACKGROUND OF THE INVENTION

In aircraft, the interior space which is enclosed by the body of the aircraft is customarily spatially divided. For forming closed spaces inside the interior space, so-called cabin monuments are used. The cabin monuments in this case serve especially for accommodating sanitary units such as toilets, was basins or the like, or serve as storage spaces.

Cabin monuments customarily have a plurality of sidewalls, delimiting an interior space, consisting of a composite material with a honeycomb structure in order to ensure a high degree of strength of the sidewalls. The sidewalls are as a rule arranged in an abutting manner by their end faces and directly screw-fastened or adhesively fastened to each other by their end faces. On account of the honeycomb structure, screw fastening of the sidewalls requires the provision of inserts in the honeycomb structure for receiving screws. In the case of adhesive fastening, the honeycomb structure is usually filled in at the end faces with a filling material for forming an adhesion surface. For stiffening of the sidewalls, braces are used in part. The installing of the cabin monument is usually carried out in the interior space of the body. In this way, the components of the cabin monument can be transported in a simple manner into the interior space of the body through access openings which are formed in the body.

US 2016/0258462 A1 describes a further possible embodiment of a cabin monument, in which the composite panels which form the cabin monument have in each case recesses and/or projections, wherein during the installation of the cabin monument the projections of one composite panel are introduced into the recesses of a respective further panel. For the fixing of the respective projection in the respective recess provision is made for a latching mechanism.

BRIEF SUMMARY OF THE INVENTION

An aspect of the present invention may provide a cabin monument for an aircraft, which can be installed in a quick and simple manner.

According to a first aspect of the invention, a cabin monument is provided for an aircraft. The cabin monument has a floor panel, which forms a base surface of the cabin monument, and a surrounding sidewall which extends transversely to the floor panel and defines an interior space of the cabin monument. The surrounding sidewall is assembled from a first wall part and a second wall part which is coupled to this. Provision is made on at least one of the wall parts for a fixing section which is overlapped by the floor panel.

According to an embodiment of the invention, a cabin monument is therefore specified, having a panel-like floor, that is to say a floor panel, and a lateral surrounding wall which extends transversely to this, that is to say a surrounding sidewall. The floor panel therefore forms a base surface of the cabin monument. The surrounding sidewall encloses or encompasses the base surface of the cabin wall and in this way delimits an interior space of the cabin monument. The sidewall is furthermore assembled according to an embodiment of the invention from two wall parts which are mechanically coupled to each other or mechanically interconnected. The wall parts in each case form a section of the surrounding sidewall and are assembled in such a way that together they define the interior space of the cabin monument. Furthermore, the wall parts extend transversely to the floor panel and therefore along a vertical axis which is perpendicular to the floor panel. Provision is made on an end section of at least one of the wall parts for a fixing section. This fixing section projects into the base surface on a rear side of the floor panel which is located opposite the interior space and therefore is overlapped by the floor panel. In this way, the fixing section can be clamped in between the floor panel and an installation base on which the cabin monument is to be erected or installed.

As a result of the assembling of the surrounding sidewall from two wall parts which are coupled to each other and together delimit the interior space of the cabin monument, the number of components is reduced compared with current cabin monuments. This facilitates and accelerates the installation. Furthermore, because of the wall parts a splitting of the outer shape of the cabin monument is effected. Consequently, the parts of the cabin monument can be transported without any problem into the interior space of an aircraft body through an access opening. The forming of a fixing section on at least one of the wall parts, which is overlapped by the floor panel, offers an efficient and reliable way of fixing the sidewall relative to the floor panel by means of clamping. Furthermore, in this way the largest part of the mechanical load, which occurs during a deformation of the installation base, is absorbed by the floor panel. Therefore, the mechanical loads of the surrounding sidewall are advantageously reduced.

According to one embodiment of the cabin monument, it can be provided that the first and the second wall parts are designed as half-shells. Accordingly, a splitting of the surrounding sidewall is carried out in such a way that each of the wall parts extends along a section of the circumference of the base surface or of the floor panel. Together, the wall parts completely enclose the base surface. For installation, the half-shell-like wall parts can be pushed onto the floor panel from opposite sides. The floor panel can therefore already be pre-assembled. This facilitates the handling of the components during the installation of the cabin monument.

Provision can be made for a fixing section both on the first and on the second wall part, wherein the first and the second fixing sections are overlapped in each case by the floor panel. The first and the second fixing sections therefore extend transversely to the vertical axis or project in a transverse direction from a main section of the wall parts. The fixing sections are especially provided in each case in a first end section with regard to the vertical axis. For installation, the wall parts can be pushed under the floor panel with their fixing sections from opposite sides. Therefore, as a result of the half-shell design, the adaptability to installation of the cabin monument is further simplified.

According to a further embodiment, the first wall part can have a first connecting section which extends transversely to a main section of the first wall part which delimits the interior space. Furthermore, it can be provided that the second wall part has a second connecting section which extends transversely to a main section of the second wall part which delimits the interior space, and wherein the first connecting section and the second connecting section are interconnected. Accordingly, flange-like connecting sections are provided in each case on the wall parts. The connecting sections therefore form flanges. Provision is therefore made on the connecting sections for surfaces or structures which can be coupled to each other. This improves the flexibility when selecting a connecting device for coupling the wall parts to each other. As a result, the adaptability to installation is further facilitated.

It can especially be provided that the first connecting section and the second connecting section are clamped inside a clamping device. According to this embodiment, a mechanical coupling of the wall parts to each other is therefore carried out by a force being applied in each case to the connecting sections of the wall parts by means of a clamping device, which force is directed in the direction of the respectively other connecting section. Therefore, a non-positively locking, preferably releasable coupling of the wall parts to each other is realised. The clamping device can be realised for example by a clamp, especially in the form of a one-piece U-clip, a screw clamp, or the like.

According to a further embodiment, the first and the second wall part can have in each case an outer cover layer, an inner cover layer and a spacing layer which connects the inner and the outer cover layers, wherein the spacing layer has a hollow structure. The wall parts are realised in this case as moulded parts which have a sandwich-like cross section. This cross sectional design offers the advantage that with low weight a high mechanical strength of the components is achieved. The hollow structure can for example be realised by a honeycomb structure, woven fabric, knitted fabric, a foam material or the like. For example, network structures which are produced by means of a generative manufacturing process can also be provided as the hollow structure.

The wall parts overall or, if applicable, the cover layers, can also be formed from a so-called SMC material. SMC in this case stands as an abbreviation for the English term "sheet moulding compound". This material group comprises especially fibre-reinforced plastic materials, wherein chopped fibre materials, e.g. chopped glass fibre, are customarily embedded in duroplastic reaction resins, e.g. polyester resin or vinyl ester resin. Also, fibre composite components, such as carbon fibre reinforced plastics or the like, are in general conceivable as wall parts or, if applicable, as cover layers. SMC materials and in general fibre composite components offer the advantage that with an exceptionally low weight these have a high mechanical loadability. Furthermore, the wall parts overall or, if applicable, the cover layers, can be produced from an injection moulded material, e.g. on a polyurethane base. By means of the plastic injection moulding, the wall parts or cover layers can be produced in a very simple and inexpensive manner and in large batch numbers.

According to a further embodiment of the cabin monument, it can be provided that provision is made on an inner lateral surface of the floor panel, facing the interior space, for a bearing device, which for example comprises bars, blocks, sleeves or the like which project from the inner lateral surface, for the fixing of functional units, such as a toilet module, shelving, or the like. The bearing device can especially be constructed in one piece with the floor panel or can be fastened to this, for example by means of adhesive fastening, screw fastening, welding or in a similar way. The bearing device forms a preferably standardised interface, which is stationary in relation to the floor panel, for installing functional units and therefore facilitates the installation.

The floor panel can be produced for example with a sandwich construction, as has already been described for the wall parts. Also, the floor panel or, if applicable, the cover layers, can be produced from an SMC material, an injection moulded material or the like. Furthermore, it can be provided that the floor panel has at least one cover layer consisting of a corrosion-resistant metal material, such as stainless steel or the like. This is particularly advantageous when the cabin monument is used as a toilet module since these materials can be easy to clean so that a high hygiene standard can be met. Other than that, the above embodiments in relation to the materials of the wall parts or cover layers similarly also apply to the floor panel.

Furthermore, a spacing device can be arranged on a rear lateral surface of the floor panel which is located in manner facing away from the interior space. The spacing device especially forms a structure which projects from the rear lateral surface. For example, the spacing device can be realised by one or more blocks, one or more sleeves, or the like. As a result of the spacing device, a predetermined distance between the rear lateral surface of the floor panel and the installation base can be established during the installation. This facilitates the insertion of the fixing section or, if applicable, of the fixing sections of the wall parts between floor panel and installation base. As a result, the adaptability to installation of the cabin monument is further facilitated. Furthermore, by the establishing of the distance by means of the spacing device a clamping force, by which the respective fixing section is clamped in between the installation base and the floor panel, can be established.

According to a further embodiment, provision can be made on an inner surface of at least one of the wall parts for a bearing device, for example in the form of bars, blocks, sleeves, rails, or the like. The bearing device serves for the fixing of functional units, for example in the form of washbasin modules, shelves, mirrors, lamps and the like. The bearing device forms a preferably standardised interface, which is stationary in relation to the respective wall part, for installing functional units and therefore facilitates the installation of functional units.

According to a further aspect of the invention, provision is made for an aircraft. The aircraft has a body, an inner floor, which extends in an interior space of the aircraft which is delimited by the body, and a cabin monument according to one of the previously described embodiments. The fixing section of the respective wall part is in this case clamped in between the floor panel and the inner floor. The inner floor therefore forms an installation base. The cabin monument can advantageously serve as a housing for a sanitary area or as a storage space.

In the case of components which are of a "one-piece", "one-part", or "integral" design, or are formed "in one piece", it is generally understood herein that these components exist as a single part which forms a material unit and in particular are produced as such, wherein the one of the other components is not separable from the others without removal of the material content.

With regard to direction specifications and axes, especially to direction specifications and axes which relate to the path of physical structures, it is understood herein by a path of an axis, of a direction or of structure "along" an another axis, direction or structure, that these, especially the tangents resulting at a respective point of the structures, extend in each case at an angle of less than, or equal to, 45 degrees, preferably less than, or equal to, 30 degrees, and especially preferably parallel to each other.

With regard to direction specifications and axes, especially to direction specifications and axes which relate to the path of physical structures, it is understood herein by a path of an axis, of a direction or of a structure "transversely" to another axis, direction or structure that these, especially the tangents resulting at a respective point of the structures, extend in each case at an angle of more than 45 degrees, preferably more than 60 degrees and especially preferably perpendicularly to each other.

BRIEF DESCRIPTION OF THE DRAWINGS

Aspects of the invention are explained in the following text with reference to the figures of the drawings. In the figures:

FIG. 3 shows a broken out sectional view of the cabin monument shown in FIG. 1, which is produced in a section along the line A-A shown in FIG. 1;

FIG. 4 shows a detailed view of the region, identified by the letter X, of the cabin monument shown in FIG. 1;

FIG. 5 shows a schematic representation of a cabin monument according to a further exemplary embodiment of the present invention in a perspective view;

FIG. 6 shows a schematic representation of a cabin monument according to a further exemplary embodiment of the present invention in a perspective view;

FIG. 7 shows a broken out sectional view of the cabin monument shown in FIG. 5, which is produced in a section along the line B-B shown in FIG. 1;

FIG. 8 shows a detailed view of the region, identified by the letter Y, of the cabin monument shown in FIG. 3;

FIG. 9 shows a perspective view of a floor panel of a cabin monument according to an embodiment of the present invention;

FIG. 10 shows a schematic view of an aircraft according to an exemplary embodiment of the present invention.

In the figures, the same designations identify the same or functionally the same components, unless a statement to the contrary is made.

DETAILED DESCRIPTION

Figure 1:
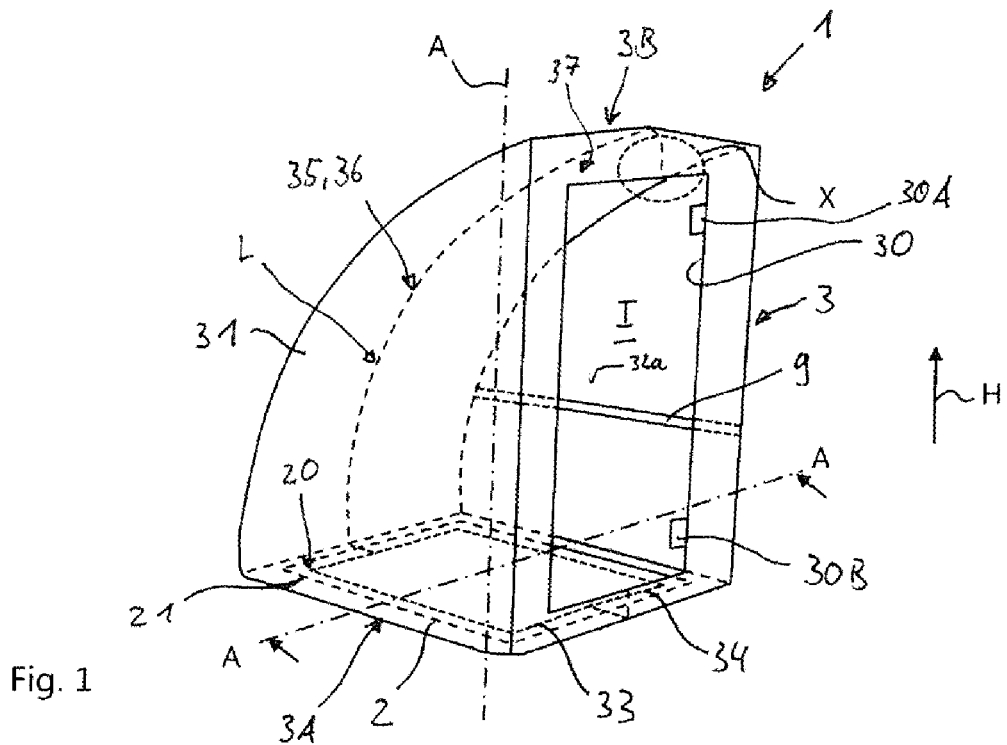
FIG. 1 shows a schematic representation of a cabin monument according to an exemplary embodiment of the present invention in a perspective view.

FIGS. 1, 5 and 6 show in each case by way of example and schematically a cabin monument 1 for an aircraft 100 in a perspective external view. As is shown in FIG. 1, the cabin monument 1 has a floor panel 2 and a surrounding sidewall 3. Furthermore, provision is made for at least one fixing section 33, 34. As an option, the cabin monument 1 additionally has a door (not shown).

The floor panel 2 forms a base surface 20 of the cabin monument 1. In FIGS. 1, 5 and 6, the floor panel 2 is shown symbolically by means of a dashed line which corresponds to the circumference 21 of the base surface 20 which is formed by the floor panel 2. As shown by way example in FIGS. 1, 5 and 6 in each case, the floor panel 2 can define a rectangular base surface 20 of the cabin monument 1. Naturally, the floor panel 2 can also form a base surface 20 with a circular, oval, polygonal circumference 21, or generally a circumference describable by a closed curve. As is especially evident from the exemplary representations of FIGS. 2 and 9, the floor panel 2 is designed as a component extending in a planar manner, preferably as a flat panel. The floor panel 2 has an inner lateral surface 2a which faces an interior space I of the cabin monument, and a rear lateral surface 2b which is oriented opposite the inner lateral surface 2a.

As is shown by way of example and schematically in FIG. 9, a bearing device 6 for the fixing of function units 7 can be provided on the inner lateral surface 2a of the floor panel 2. In FIG. 9, two spaced apart blocks 6A, 6B, which project from the inner lateral surface 2a, are provided by way of example as the bearing device 6. The bearing device 6 serves for the mounting of functional units 7. The bearing device 6 can especially be constructed in one piece with the floor panel or can be fastened to this, for example by means of adhesive fastening, screw fastening, welding or the like. The functional units 7 can especially have in each case a mounting device or guiding device (not shown) by means of which the respective functional unit 7 can be coupled to the bearing device 6 of the floor panel. For example, provision can be made on the respective functional unit 7 for a recess or sleeve (not shown) which has a cross section which corresponds to the cross section of the respective block 6A, 6B and which is pushed onto the respective block 6A, 6B. The functional unit 7 can be a toilet module 7A, for example.

Figure 2:
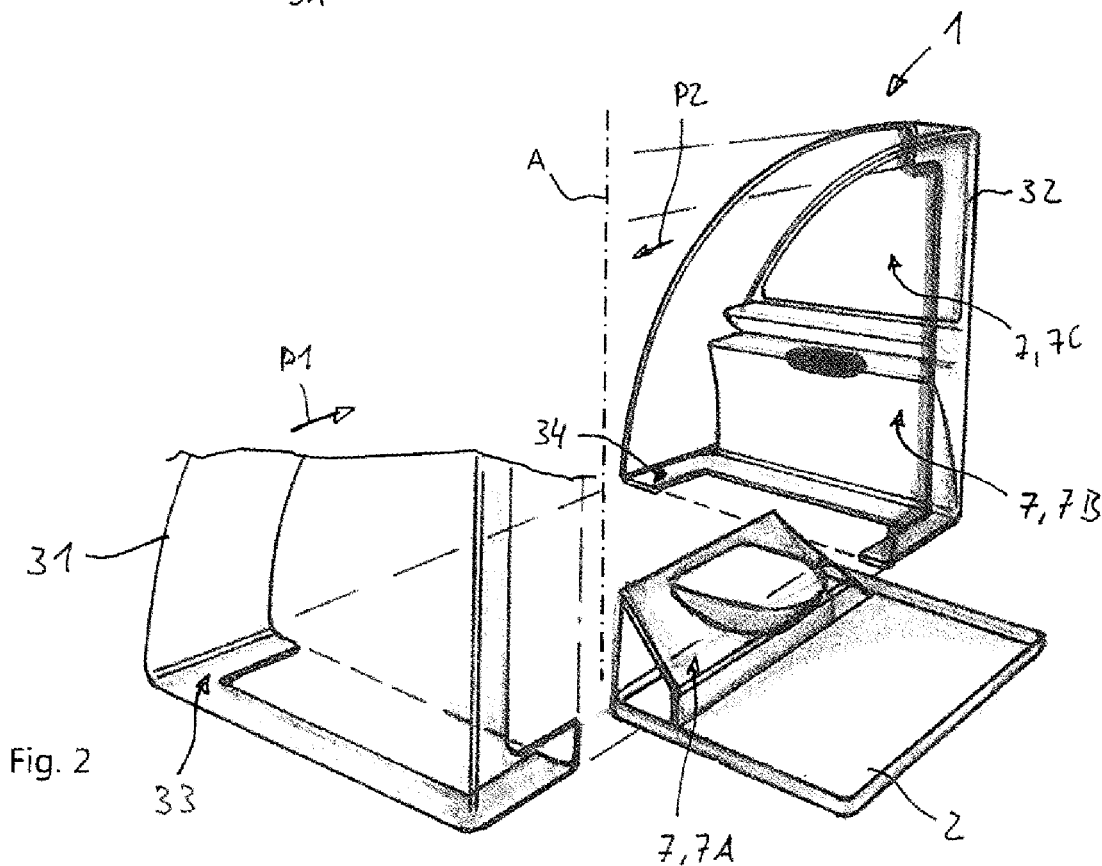
FIG. 2 shows a schematic representation of a cabin monument according to an exemplary embodiment of the present invention in a perspective exploded view.

Shown by way of example in FIG. 2 is a toilet module 7A which is coupled to the floor panel 2.

As is also shown in FIG. 9, provision can be made on the floor panel 2 for fastening recesses 22 through which fastening devices 40, such as screws, bolts or the like, can be guided for fastening the floor panel 2 on an installation base 50. Shown by way of example in FIG. 9 are five fastening recesses 22 of which in each case one is arranged in an edge region, especially in the region of corners of the floor panel 2, and one is arranged in a central region of the floor panel 2. FIG. 9 also shows by way of example that a cable cutout 23 can be provided. This serves for the lead through or for the forming of connecting cables for a functional unit 7, for example for the lead through of a waste pipe of a toilet module 7A. The cable cut-out 23 can be designed for example with a rectangular cross-sectional shape, as shown in FIG. 9, or in another cross-sectional shape, e.g. circular, polygonal, oval or the like.

As shown in FIGS. 3 and 7, a spacing device 8 can be arranged on the rear lateral surface 2b. The spacing device 8 in general forms a structure which projects from the rear lateral surface 2b and serves for keeping the rear lateral surface 2b at a predetermined distance d from the installation base 50. For example, the spacing device can be realised by means of one or more blocks, one or more sleeves or the like. In FIGS. 3 and 7, the spacing device 8 is realised as a spacing panel which is arranged in the central region of the floor panel 2. The optional spacing device 8 keeps the rear lateral surface 2b of the floor panel 2 at a distance d from the installation base 50. This facilitates an insertion of the respective fixing section 33, 34 between the floor panel 2 and the installation base 50, as is described more accurately below.

As is also shown in FIGS. 1, 5 and 6, the surrounding sidewall 3 extends transversely to the floor panel 2. In this case, a first end region 3A of the surrounding sidewall 3 is arranged on the floor panel 2. A second end region 3B of the surrounding sidewall 3 is arranged opposite the first end region 3A with regard to a vertical axis A of the cabin monument 1 which is perpendicular to the floor panel 2, especially perpendicular to the inner surface 2a of the floor panel 2. The surrounding sidewall 3 encloses the vertical axis A of the cabin monument 1 at least in the region of the first end region 3A and in this way delimits an interior space I of the cabin monument 1. As is shown schematically in FIGS. 1, 5 and 6, the surrounding sidewall 3 delimits the interior space I along the circumference 21 of the base surface 20. As is also shown schematically in FIGS. 1, 5 and 6, the surrounding sidewall 3 can have on a front side a recess 30 which forms an access opening to the interior space I of the cabin monument 1. The recess 30 can for example be closed or opened by means of a door (not shown) which can be installed on the cabin monument 1 by means of connecting devices 30A, 30B. In FIGS. 1, 5 and 6, the connecting devices 30A, 30B are shown only symbolically and can be realised for example in the form of hinges or the like. As is also shown in FIGS. 1, 5 and 6, at least one wall sub-region 3C of the surrounding sidewall 3, which extends along a section of the circumference 21 of the base surface 20, can form an arc-shape cover of the floor panel 2 or of the base surface 20. As shown by way of example in FIGS. 1, 5 and 6, the surrounding sidewall 3 can have an arc-shaped wall sub-region 3C which is provided on a rear side of the cabin monument 1 which lies opposite the front side of the cabin monument 1.

As FIGS. 1, 5 and 6, and especially FIG. 2, show in each case, the surrounding sidewall 3 is assembled from a first wall part 31 and a second wall part 32. The second wall part 32 is mechanically coupled to the first wall part 31 or connected to this. The first and the second wall parts 31, 32 are especially assembled in such a way, or positioned relative to each other in such a way, that these delimit or define the interior space I of the cabin monument 1. The first and the second wall parts 31, 32 are therefore realised in each case as moulded parts in such a way that these can be assembled for delimiting a desired shape of the interior space I and arranged on the floor panel 2. The surrounding sidewall 3 of the cabin monument 1 can therefore be realised by the connecting or coupling of the wall parts 31, 32 along a single joining line L, as is shown symbolically in FIGS. 1, 5 and 6. This advantageously reduces the number of components of the cabin monument 1 and therefore especially the installation cost.

The wall parts 31, 32 have in each case an inner surface 31a, 32a which faces the interior space I of the cabin monument 1. Provision can be made on at least one of the wall parts 31, 32 for a bearing device 9, for example in the form of bars, blocks, rails or the like. Shown symbolically in FIG. 1 is a bearing device 9 in the form of a rail which is arranged on the inner surface 32a of the second wall part 32. The bearing device 9 can be formed in one piece with the respective wall part 31, 32 or be fastened to this and serves for the fixing of functional units 7 on the respective wall part 31, 32. Shown by way of example in FIG. 2 is a functional unit 7 in the form of a washbasin 7B and a functional unit 7 in the form of a mirror 7C which in each case are fixed on a bearing device 9 (not visible in FIG. 2) which is arranged on the inner surface 32a of the second wall part 32.

The first and the second wall parts 31, 32 can in each case be realised as a sandwich component. FIG. 8 schematically shows a possible cross section of a wall part 31, 32 which is realised as a sandwich component. As can be seen in FIG. 8, the respective wall part 31, 32 has in this case an outer cover layer 31A, 32A, an inner cover layer 31B, 32B and a spacing layer 31C, 32C which connects the inner cover layer 31A, 32A and the outer cover layer 31B, 32B. A hollow structure forms the spacing layer 31C, 32C. The outer cover layer 31A, 32A and the inner cover layer 31B, 32B can in each case be formed as solid layers, especially plastic layers, e.g. consisting of a polymer material such as polyamide or the like, or fibre composite material, e.g. an SMC material or in general consisting of a fibre-reinforced composite material. The core or the spacing layer 31C, 32C can for example be formed from a foam material, e.g. a polyurethane foam, or as a honeycomb structure or in another way.

As shown by way of example in FIGS. 1 to 3 and 5 to 7, provision is made on at least one of the wall parts 31, 32 for a fixing section 33, 34 which is overlapped by the floor panel 2. The fixing section 33, 34 can especially be formed in one piece with the respective wall part 31, 32 or be fastened to the respective wall part 31, 32, for example by means of screw fastening, adhesive fastening, welding or the like. As is shown in particular in FIGS. 3 and 7, the fixing section 33, 34 projects from the respective wall part 31, 32 and extends in the direction of the vertical axis A. As a result, the fixing section 33, 34 projects into the base surface 20 on a rear side of the floor panel 2 which is located opposite the interior space I.

As is shown by way of example in FIG. 2, the respective fixing section 33, 34 can especially be designed as a strip-like or panel-like planar region.

When the cabin monument 1 is installed on an installation base 50, as is shown by way of example and schematically in FIGS. 3 and 7, the respective fixing section 33, 34 is arranged between the installation base 50 and a rear lateral surface 2b of the floor panel 2 which faces this. In this case, the respective fixing section 33, 34 can be clamped in between the floor panel 2 and the installation base 50. As a result, a particularly simple fixing of the respective wall part 31, 32 in relation to the floor panel 2 is achieved. Alternatively or additionally to clamping, fastening of the respective fixing section 33, 34 on the floor panel 2, and optionally also on the installation base, can be provided by means of a fastening device 40, e.g. in the form of a screw, a bolt or the like. Shown symbolically in FIGS. 3 and 7 is the fastening device 40 as a screw which extends through the floor panel 2 and the respective fixing section 33, 34 right into the installation base 50.

As shown by way of example in FIGS. 1, 2 and 6, the first and the second wall parts 31, 32 are designed in each case as half-shells. In this case, the wall parts 31, 32 extend along a sub-section of the circumference 21 of the base surface 20, wherein the first and the second wall parts 31, 32 together encompass or enclose the entire circumference 21 of the base surface 20. As shown in FIGS. 1 and 6, the wall parts 31, 32 furthermore extend in each case along the vertical axis A. The wall parts 31, 32 are connected along the joining line L, or the surrounding sidewall 3 is split by the wall parts 31, 32 along the joining line L. It can especially be provided in this case that the vertical axis A and the joining line L extend in one plane, as is shown by way of example in FIG. 1. It can also be provided that the joining line L extends obliquely to the vertical axis A, as shown by way of example in FIG. 6. The joining line can itself extend within one plane or as a three-dimensionally describable curve.

As is shown in FIGS. 1 to 3 and 6, provision is preferably made for a first fixing section 33 on the first shell part 31 and a second fixing section 34 on the second shell part 32. In this case, both the first and the second fixing section 33, 34 are overlapped in each case by the floor panel 2. However, it can also be provided that provision can be made for a fixing section 33 or 34 only on the first wall part 31 or only on the second wall part 32.

As can be seen especially from FIGS. 2 and 3, installation of the cabin monument 1 can be carried out for example by the floor panel 2 first of all being arranged on the installation base 50. This can especially be arranged on the installation base in such a way that the rear lateral surface 2b is located at a predetermined distance d from the installation base 50.

This can be realised by means of the spacing device 8. Furthermore, the floor panel 2 can already be fastened or fixed on the installation base 50, for example by means of a fastening device 40 in the form of a screw, as shown by way of example in FIG. 3. The half-shell-like wall parts 31, 32 are then arranged on the floor panel 2, wherein the fixing sections 33, 34 which project from the wall parts 31, 32 are inserted from opposite sides of the floor panel 2 between the floor panel 2 and the installation base 50, as is shown symbolically in FIG. 2 by means of the arrows P1 and P2. As an option, an additional fastening of the fixing sections 33, 34 on the floor panel 2 and/or on the installation base 50 can then be carried out, e.g. by means of a fastening device 40, e.g. in the form of a screw, as is shown schematically in FIG. 3. Furthermore, a mechanical coupling of the wall parts 31, 32 to each other along the joining line L is carried out. Possible embodiments of the mechanical coupling are dealt with in more detail below.

Alternatively to the embodiments of the wall parts 31, 32 as half-shells, shown by way of example in FIGS. 1 and 6, the wall parts 31, 32 can also be designed as tower segments, as shown by way of example in FIG. 5. In this case, the first wall part 31 is designed as a first tower segment 61 which encompasses the entire circumference 21 of the base surface 20. The second wall part 32 is designed as a second tower segment 62 and is seated on top of the first tower segment 61 with regard to the vertical axis A. By means of the wall parts 31, 32 which are designed as tower segments 61, 62, the surrounding sidewall 3 is therefore split with regard to a vertical direction H of the cabin monument 1 which extends along the vertical axis A. As is shown by way of example in FIG. 5, the joining line L can especially extend in one plane. The joining line L, however, can also extend as a three-dimensionally describable curve.

Installation of a cabin monument 1, in which the wall parts 31, 32 are designed as tower segments 61, 62, can be carried out for example by the floor panel 2 first of all being arranged on the installation base 50. In particular, this can be arranged on the installation base in such a way that the rear lateral surface 2b is located at a predetermined distance d from the installation base 50. This can be realised for example by means of the spacing device 8. Furthermore, the floor panel 50 can already be fastened or fixed on the installation base 50, for example by means of a fastening device 40 in the form of a screw, as shown by way of example in FIG. 7. The first wall part 31, which is designed as the first tower segment 61, is then arranged on the floor panel 2, wherein the fixing section 33, which projects from the first wall part 31, is inserted from one side of the floor panel 2 between the floor panel 2 and the installation base 50. As an option, an additional fastening of the fixing section 33 on the floor panel 2 and/or on the installation base 4 can then be carried out, e.g. by means of a fastening device 40, e.g. in the form of a screw, as is shown schematically in FIG. 7. Furthermore, a seating of the second wall part 32, which is designed as the second tower segment 62, on the first tower segment 61 and also a mechanical coupling of the wall parts 31, 32 to each other along the joining line L are then carried out. Possible embodiments of the mechanical coupling are dealt with in more detail below.

In FIGS. 1, 5 and 6, the joining line L is drawn symbolically as a dashed line. The wall parts 31, 32 are interconnected or mechanically coupled to each other along the joining line L. The mechanical coupling can especially be realised by the connecting section 35, 36 which is provided in each case on the wall parts 31, 32. FIG. 4 shows an enlarged sectional view which is produced in a section through the wall parts 31, 32 in the region of the joining line L perpendicularly to said joining line L. As shown by way of example in FIG. 4, the first wall part 31 has a first connecting section 35 which extends transversely to a main section 37 of the first wall part 31 which delimits the interior space I. Furthermore, the second wall part 32 has a second connecting section 36 which extends transversely to a main section 38 of the second wall part 32 which delimits the interior space I. The first and the second connecting sections 35, 36 therefore project into the interior space I or project outwards from the respective wall part 31, 32. The first and the second connecting sections 35, 36 can especially be designed as flanges, as is shown by way of example in FIG. 4. It can also be provided that the connecting sections 35, 36 extend in each case over the entire length of the joining line L or extend only over one or more discrete sub-sections of this.

The first connecting section 35 and the second connecting section 36 are fastened to each other. In this case, the connecting sections 35, 36 can butt against each other in each case, as is shown by way of example in FIG. 4, or an interposing layer (not shown), e.g. in the form of an elastic lip for tolerance compensation or for sealing, can be arranged between the connecting sections 35, 36. The fastening of the connecting sections 35, 36 can especially be carried out by means of a clamping device 5, as is shown schematically and by way of example in FIG. 4. In this case, the first connecting section 35 and the second connecting section 36 are clamped inside the clamping device 5. By means of the clamping device 5, a non-positive connection, which is simple to assemble and release, between the connecting sections 35, 36 is realised. The clamping device 5, as shown schematically in FIG. 4, can be realised for example as a spring clip or elastic clip. The clamping device 5 can also be designed for example as a clamp or the like.

Figure 11:
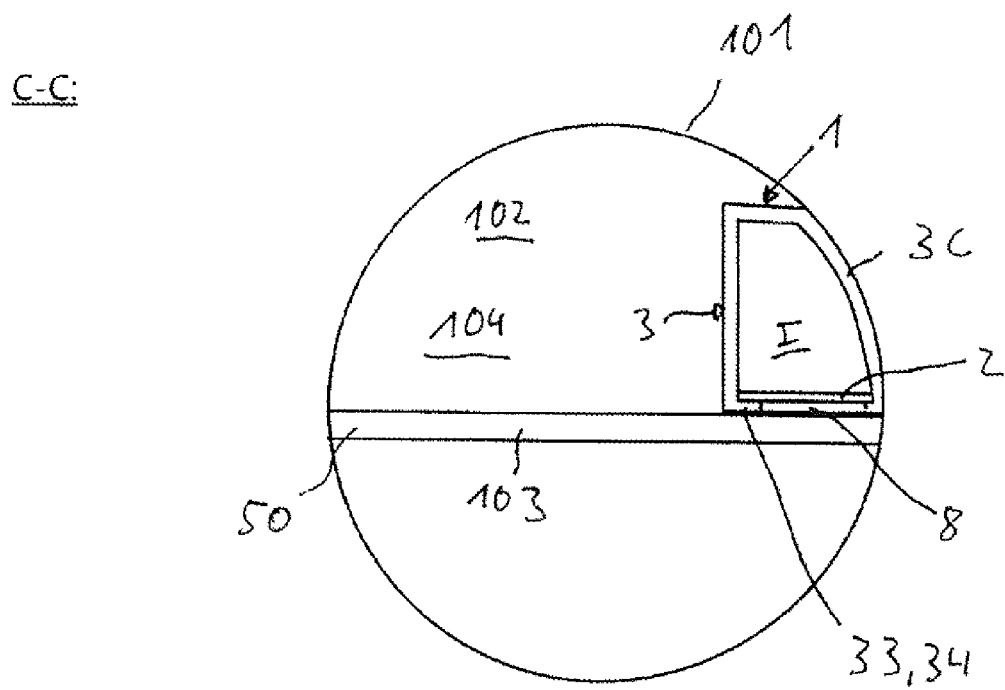
FIG. 11 shows a simplified, schematic sectional view of the aircraft shown in FIG. 10, which is produced in a section along the line C-C shown in FIG. 10.

FIG. 10 shows by way of example an aircraft 100 with a body 101. FIG. 11 schematically shows a simplified sectional view of the body 101. The body 101 delimits an interior space 102 of the aircraft 100 in which extends the inner floor 103. For example, the inner floor 103 together with the body 101 form an interior space section 104. The interior space section 104 can for example comprise a passenger cabin of the aircraft 100. The cabin monument 1 is arranged on the inner floor 103, that is to say the inner floor 103 of the aircraft 100 forms an installation base 50 on which the floor plate 2 of the cabin monument 1 is arranged. The rear side of the cabin monument 1 is preferably arranged in a manner adjoining the body 101. As can be seen in FIG. 11, as a result of the arc-shaped design of the rear-side wall sub-region 3C of the surrounding sidewall 3 the space utilisation of the interior space 102 or of the interior space section 104 is improved. The cabin monument 1 preferably forms a housing of a toilet room in the aircraft 100.

As show schematically and in a simplified manner in FIG. 11, the fixing section 33, 34 is inserted between the floor panel 2 and the inner floor 103 and, if applicable, fixed. This can be realised in the way described above, e.g. with reference to FIGS. 3 and 7.

Although the present invention has been explained by way of example above based on exemplary embodiments, it is not limited thereto, but can be modified in a variety of ways. In particular, combinations of the preceding exemplary embodiments are also conceivable.

LIST OF DESIGNATIONS

1 Cabin monument
2 Floor panel

2a Inner lateral surface
2b Rear lateral surface
3 Surrounding sidewall
3A First end region of the surrounding sidewall
3B Second end region of the surrounding sidewall
3C Wall sub-region
5 Clamping device
6 Bearing device
6A, 6B Block
7 Functional unit
7A Toilet module
7B Washbasin
7C Mirror
8 Spacing device
9 Bearing device
20 Base surface
21 Circumference of the floor panel
22 Fastening recesses
30 Recess of the surrounding sidewall
31 First wall part
31A Outer cover layer of the first wall part
31a Inner surface of the first wall part
31B Inner cover layer of the first wall part
31C Spacing layer of the first wall part
32 Second wall part
32A Outer cover layer of the second wall part
32a Inner surface of the second wall part
32B Inner cover layer of the second wall part
32C Spacing layer of the second wall part
33 Fixing section of the first wall part
34 Fixing section of the second wall part
35 First connecting section
36 Second connecting section
37 Main section of the first wall part
38 Main section of the second wall part
40 Fastening device
50 Installation base
61 First tower segment
62 Second tower segment
100 Aircraft
101 Body
102 Interior space of the aircraft
103 Inner floor
104 Interior space section
A Vertical axis
d Distance
H Vertical direction
I Interior space
L Joining line
P1 Arrow
P2 Arrow While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft, comprising:
a body;
an inner floor, which extends in an interior space of the aircraft which is delimited by the body; and
a cabin monument comprising:
a floor panel, which forms a base surface of the cabin monument, and has an inner lateral surface and a rear lateral surface; and
a surrounding sidewall, extending transversely to the floor panel, which defines an interior space of the cabin monument;
wherein the surrounding sidewall is assembled from a first wall part and a second wall part which is coupled to the first wall part; and
wherein at least one of the wall parts comprises a fixing section having a top surface and a bottom surface, wherein the fixing section is overlapped by the floor panel such that the rear lateral surface of the floor panel rests on the top surface of the fixing section, and wherein the fixing section is clamped in between the floor panel and the inner floor.

2. The aircraft according to claim 1, wherein the first and the second wall parts are configured as half-shells.

3. The aircraft according to claim 2, wherein the first wall part comprises a first fixing section and the second wall part comprises a second fixing section, wherein the first and the second fixing sections are overlapped in each case by the floor panel.

4. The aircraft according to claim 1, wherein the first wall part has a first connecting section which extends transversely to a main section of the first wall part which delimits the interior space, and the second wall part has a second connecting section which extends transversely to a main section of the second wall part which delimits the interior space, and wherein the first connecting section and the second connecting section are interconnected.

5. The aircraft according to claim 4, wherein the first connecting section and the second connecting section are clamped inside a clamping device.

6. The aircraft according to claim 1, wherein the first and the second wall parts have in each case an outer cover layer, an inner cover layer and a spacing layer which connects the inner cover layer and the outer cover layer, wherein the spacing layer has a hollow structure.

7. The aircraft according to claim 1, wherein a bearing device for the fixing of functional units is arranged on the inner lateral surface of the floor panel which faces the interior space.

8. The aircraft according to claim 1, wherein a spacing device is arranged on the rear lateral surface of the floor panel which is located in a manner facing away from the interior space.

9. The aircraft according to claim 1, wherein a bearing device for the fixing of functional units is arranged on an inner surface of at least one of the wall parts.

10. The aircraft according to claim 1, wherein the fixing section is perpendicular to the at least one of the wall parts.

11. The aircraft according to claim 1, wherein the fixing section and the rear lateral surface are parallel to the inner floor.

\* \* \* \* \*